United States Patent

[11] 3,580,031

| [72] | Inventors | Vincent J. Donadio<br>Pompton Plains;<br>Olavi F. Anderson, Succasunna, N.J. |
|---|---|---|
| [21] | Appl. No. | 835,045 |
| [22] | Filed | June 20, 1969 |
| [45] | Patented | May 25, 1971 |
| [73] | Assignee | The United States of America as represented by the Secretary of the Army |

[54] MANUFACTURING APPARATUS
4 Claims, 4 Drawing Figs.

[52] U.S. Cl............................................. 72/186, 72/194
[51] Int. Cl..................................... B21d 13/10
[50] Field of Search........................... 72/71, 185, 186, 194

[56] References Cited
UNITED STATES PATENTS

| 397,422 | 2/1889 | Fuller............................ | 72/186 |
| 625,804 | 5/1899 | Reed.............................. | 72/186 |
| 3,239,912 | 3/1966 | Baumgartner et al. ....... | 72/185X |

*Primary Examiner*—Theron E. Condon
*Assistant Examiner*—E. F. Desmond
*Attorneys*—Harry M. Saragovitz, Edward J. Kelly and Herbert Berland S. Dubroff ABSTRACT: A machine for manufacturing flechettes at substantially higher rates of production and operating efficiency. The machine has a plurality of rotatable wheels each having a plurality of peripherally spaced eccentric bushings. Each bushing has a central axis that extends radially of its wheel and perpendicularly of a peripheral centerline of the wheel. Each bushing contains a die insert and is mounted for transverse adjustment of the bushing central axis relative to the corresponding wheel centerline. Each die insert has a fin-forming portion and a nose-forming portion that cooperate to provide a positive means of feeding a workpiece through the machine. Each wheel has a main body-forming portion intermediate the fin-forming portion of each die and the nose-forming portion of the following adjacent die.

Patented May 25, 1971　　　3,580,031

INVENTORS,
VINCENT J. DONADIO
OLAVI F. ANDERSON

Patented May 25, 1971 3,580,031
2 Sheets-Sheet 2
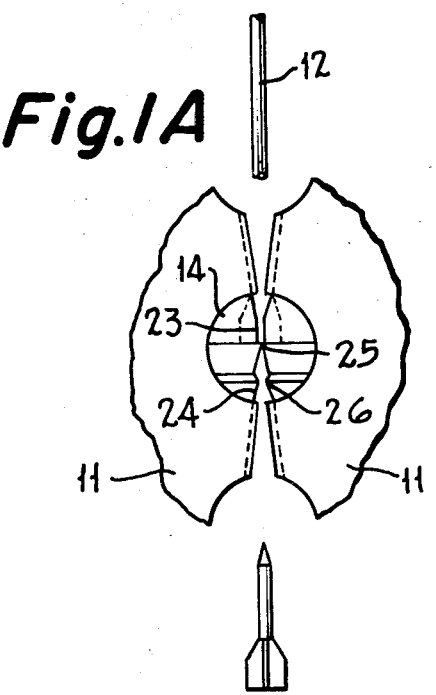
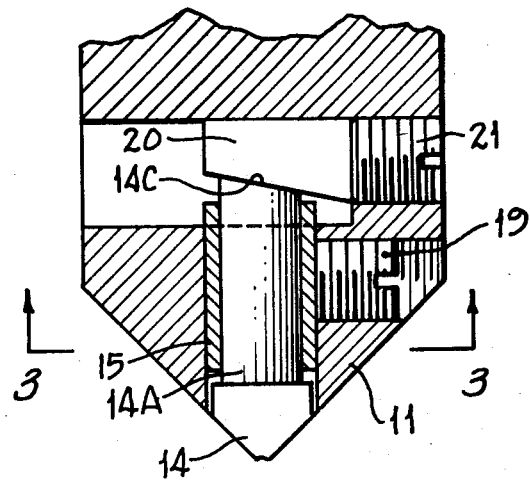
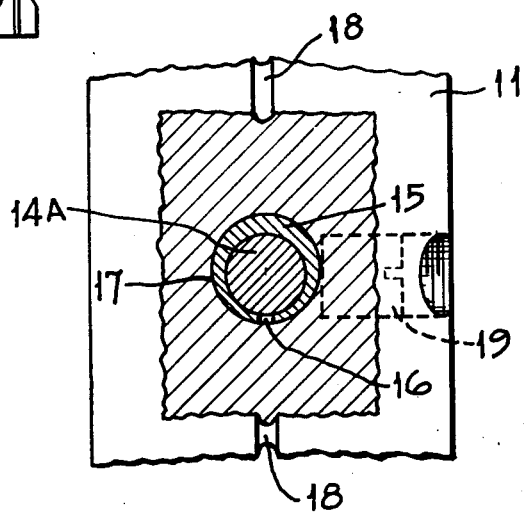
INVENTORS,
VINCENT J. DONADIO
OLAVI F. ANDERSON
BY: *Harry M. Saragovitz,*
*Edward J. Kelly, Herbert Berl &*
*S. Dubroff* ATTORNEYS.

MANUFACTURING APPARATUS

The invention described herein may be manufactured, used, and licensed by or for the Government for governmental purposes without the payment to us of any royalty thereon.

This invention relates to manufacturing apparatus and, more particularly, to a machine for manufacturing flechettes.

One of the objects of the invention is to provide a machine that manufactures flechettes at substantially higher rates of production and operation efficiency.

A further object of the invention is to provide such a machine which has a minimum of parts and overhead expense.

In one aspect of the invention the flechette manufacturing machine has a plurality of rotatable wheels each having a plurality of peripherally spaced eccentric bushings whose respective central axis extends radially of its wheel and perpendicularly of a peripheral centerline of the wheel, and each eccentric bushing containing a die insert and being mounted for transverse adjustment of the bushing central axis relative to the corresponding wheel centerline.

In another aspect of the invention each die insert has a fin-forming portion and a nose-forming portion, and each wheel has a main body-forming portion intermediate the fin-forming portion of each die and the nose-forming portion of the following adjacent die.

In another aspect of the invention the fin- and nose-forming portions of each die insert provide a positive means of feeding a workpiece through the machine.

In a further aspect of the invention the fin- and nose-forming and feeding portions sequentially cooperate in overlapping phases of operation.

These and other objects, advantages and features will become more apparent from the following description and accompanying drawings in which:

FIG. 1A is an enlarged view partially broken away of an operative wheel portion of the FIG. 1 machine.

FIG. 2 is a partial sectional view of a wheel showing a representative tool mounting.

FIG. 3 is an enlarged partial sectional view taken along line 3–3 of FIG. 2.

Figure 1:
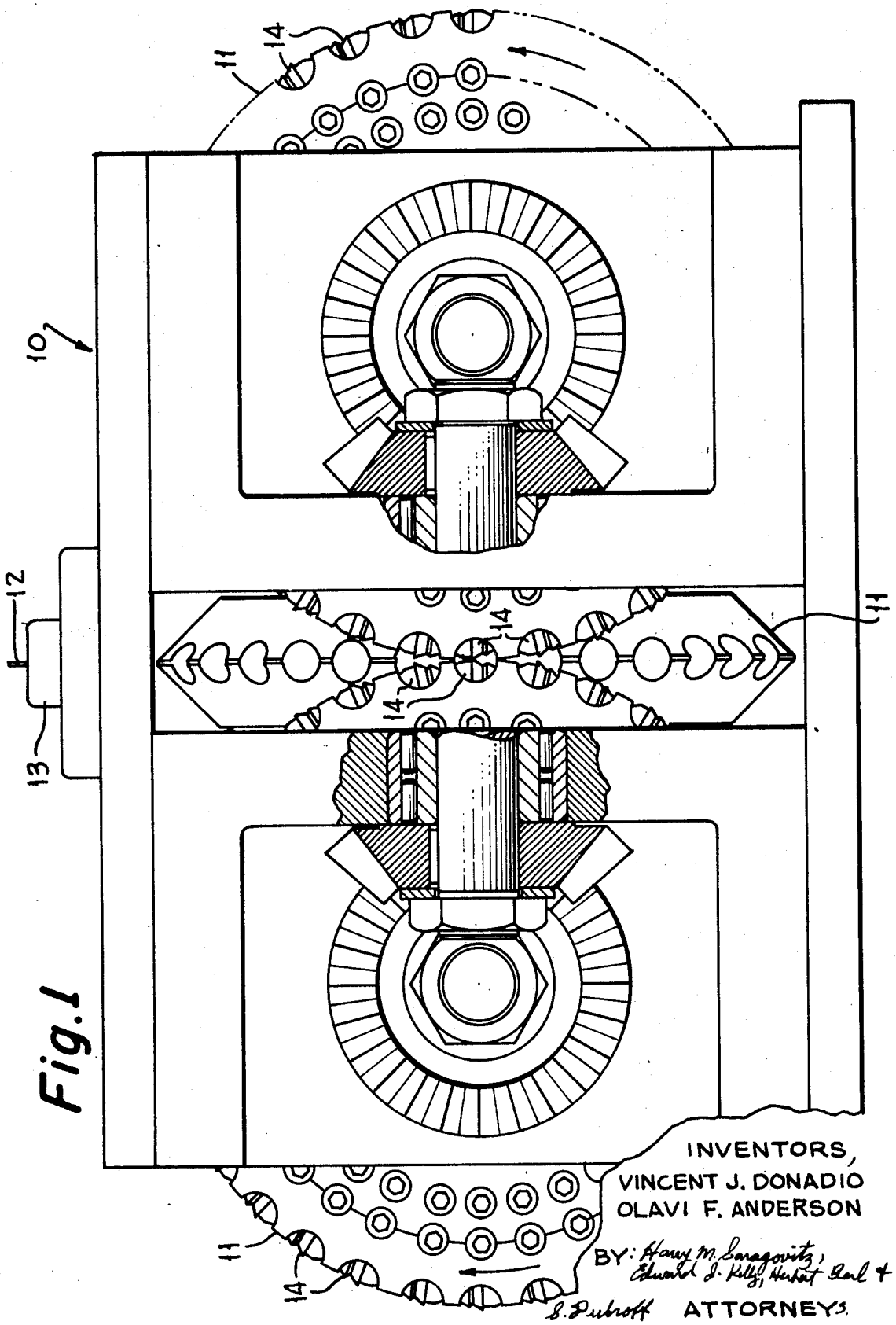
FIG. 1 is an elevational view partially broken away of a flechette manufacturing machine embodying the principles of the invention, one wheel having been omitted for the sake of clarity.

The flechette manufacturing machine shown generally at 10 (FIG. 1) preferably includes four embossing wheels 11 arranged in pairs of two planarly aligned wheels, each pair being rotatable and interlocked by a suitable drive means (not shown) and disposed perpendicularly to the other pair at substantially a common tangential line of intersection through which stock wires 12 is fed downwardly from an elevated guide bushing 13. The wheels are rotated in unison such that the corresponding peripherally spaced tools 14 FIGS. 1, 1A) on each wheel are moved downwardly through the common point of tangency to pull or feed the wire 12 while successively forming the flechette products an extremely high rate of production.

Each tool or die insert 14 has a shaft portion 14A (FIGS. 2, 3) mounted in an eccentric bushing 15 for fine adjustment as will be discussed hereinafter. Each eccentric bushing is longitudinally split at 16 (FIG. 3) and is adjustably secured, with tool shaft 14A clamped therein, in its corresponding radial wheel bore or opening 17 by threaded setscrew means 19. Openings 17 are predeterminately formed at equally spaced peripheral intervals along the peripheral concavity 18, the peripheral centerline of the wheel. The rearward inclined surface 14C of tool shaft 14A functions, upon movement of the transversely slidable wedge 20 and its adjusting screw 21, to set the tool 14 at its desired setting longitudinally of the wheel bore 17.

The fins of the manufactured flechettes are formed first by fin-forming portions 23 of the mating dies 14 of the four wheels 11 as each group of corresponding dies tangentially meet. Actually the portions 23 form the lateral spacing between the formed fins. The main body of the flechette is preferably of stock wire diameter as determined by the design of and subject to straightening by the peripheral concavities 18 leading to the following groups of die inserts, the leading portions 24 of which form the nose portion of the flechette. The respective cutoff points 25 and partial cutoff points 26 on the dies insure that waste material therebetween will be clearly severed from the finished flechette during a subsequent tumbling or equivalent operation.

However, the partial cutoff points 26 at the rearward edges of the nose-forming die portions 24 leave sufficient material at the longitudinal axis of the workpiece that the fin- and nose-forming die portions 23, 24 provide a positive means of feeding the workpiece or wire material 12 through the machine, at a constant rate with the fin- and nose-forming and feeding portions sequentially cooperating in overlapping phases of operation. With this arrangement the machine can manufacture flechettes at the very high rate of 4,000 or more per minute. The cutting portions of the dies may alternately be formed as cutting edge and anvil portions, that is cutting edge portions on opposed wheels and anvil portions on the intersection opposed wheels.

By rotation of the split eccentric bushing 15, whose central axis normally extends radially of its wheel and perpendicularly of the wheel peripheral centerline, desired corrective adjustment of he common bushing and tool shaft central axis may be obtained transversely of the wheel centerline.

We wish it to be understood that we do not desire to be limited to the exact details of construction shown and described, for obvious modifications will occur to a person skilled in the art. For example, the dies may be cammed to act on wire when the wheels are rotated through their point of tangency with the cam surface for the respective dies being stationary. Such an arrangement would eliminate all shaft bearing loads and provide transmittal of force directly from the cammed surface through the die to the wire being formed. This minimizes deflection of the forming components in the basic machine.

We claim:

1. In a flechette manufacturing machine having a plurality of rotatable wheels, each of said wheels having a plurality of peripherally spaced eccentric bushings each with a central axis extending radially of said wheel and perpendicularly of a peripheral centerline of said wheel, each of said eccentric bushings being mounted for transverse adjustment of said eccentric bushing central axis relative to said wheel centerline, and
a die insert in each of said bushings.

2. The arrangement in accordance with claim 1 wherein each die insert has a fin-forming portion and a nose-forming portion, and each wheel has a main body-forming portion intermediate said fin-forming portion of each die and said nose-forming portion of the following adjacent die.

3. The structure of claim 2 wherein said fin- and nose-forming portions of each die insert provide a positive means of feeding a workpiece through said machine and cutting said workpiece.

4. The structure of claim 3 wherein said fin- and nose-forming and feeding portions sequentially cooperate in overlapping phases of operation.